SUPERCONDUCTIVE SWITCHING COMPONENT

Filed June 10, 1960

EUGENE C. CRITTENDEN, JR.
RUEBEN S. SPRIGGS
INVENTORS.

BY David P. Ogden
Albert Rosen
ATTORNEYS.

United States Patent Office 3,055,775
Patented Sept. 25, 1962

3,055,775
SUPERCONDUCTIVE SWITCHING COMPONENT

Eugene C. Crittenden, Jr., Monterey, and Rueben S. Spriggs, Manhattan Beach, Calif., assignors to Space Technology Laboratories, Inc., Los Angeles, Calif., a corporation of Delaware Filed June 10, 1960, Ser. No. 35,155
6 Claims. (Cl. 117—212)

This invention concerns itself with a metallurgical arrangement for the solution of a problem in the art of high-speed superconductive computers and has particular relation to a new superconductive computer alloy component and a novel method and apparatus for making it.

In the superconductive computer art, high-speed superconductive switching devices make use of extremely thin-film (on the order of .25 micron or less) electrically conductive components capable of being switched between superconductive and resistive states at temperatures close to absolute zero. In order to realize certain advantages of alloy solutions in superconductive components, the alloy films must be extremely thin and dependably reproducible. The alloys heretofore used in the fabrication of such components have not exhibited the superconductive change of state characteristics required.

One of the most useful superconductive metals for such high-speed computer components is elemental tin. However, pure tin components are subject to "tin disease," a change in tin state wherein pure tin metal (usually referred to as white tin) exhibits a tendency to transform to a gray powder when subjected to an environment involving the passing through a temperature range of between 18° C. and close to absolute zero.

According to the present invention, it has been found that certain alloy solutions of tin are not subject to "tin disease" and yet are suitable for use as high speed superconductive computer components. Thus, for example, it has been found that the addition of a small amount of bismuth or antimony, within a predetermined range, provides a tin alloy which has the high speed superconductive-to-resistive switching characteristics of pure tin, when the resultant component is a substantially completely homogeneous solution alloy and is in the form of a very thin, vapor deposited film. However, both bismuth and antimony have vaporizing temperatures that are different from that of tin, and the vapor deposition of a required homogeneous alloy solution in the required thin-film form will be of value to the manufacturing industry particularly relative to a superconductive art.

In the usual process of metallic vapor deposition, the metal to be deposited is heated, as in a receptacle or on a hot wire, to a temperature which will vaporize the metal. Generally, vapor deposition is attempted only with a single material because any attempt to simultaneously vaporize a plurality of materials results in selective vaporization dependent upon the particular temperature characteristic at which any one of the plurality of materials vaporizes. Consequently, in the past the obtaining of a homogeneous alloy of materials having substantially different vapor temperatures by vapor deposition techniques has been considered impractical. Nevertheless, certain components which are most feasibly made by vapor deposition, such as the thin-film superconductive components referred to, will be greatly improved when they are vapor deposited as alloys.

Further objects and advantages of this invention will become apparent and this invention will be better understood from the following description taken in connection with the accompanying drawing. The features of novelty which characterize this invention will be pointed out with particularity in the claims annexed to and forming a part of the specification. In the drawing, wherein like reference characters refer to like parts:

Figure 1:
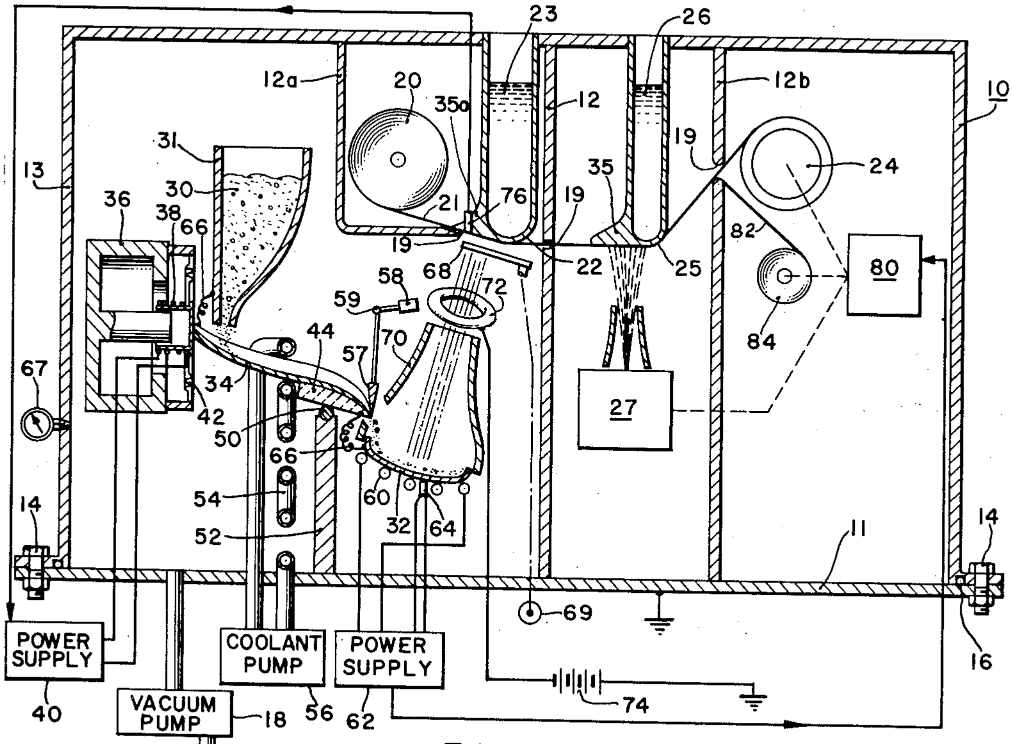
FIG. 1 is a side elevation view, partially in block diagram, of one embodiment of an apparatus suitable for practicing an aspect of the present invention.

Referring now to the drawing, FIG. 1 depicts a sectional view of a vacuum chamber 10 having a base 11, several centrally located vapor shields 12, **12*a*, 12*b*, and a top portion 13 secured to the chamber base 11 by any conventional means, such as by a plurality of bolts 14. An airtight seal between the top 13 and the chamber 10 is obtained through the use of a soft metal or resilient plastic sealing ring 16. After the chamber 10 is sealed by the tightening of the bolts 14, it is evacuated by a diffusion vacuum pump 18. For the vapor deposition process described below, an acceptable vacuum is one of less than $10^{-7}$ millimeters of mercury. Because of the apertures 19, each portion of the chamber 10** will be similarly evacuated.

Prior to the sealing of the chamber 10, a supply reel 20 of a relatively flexible substrate material 21 such as that known as Mylar (a polyester film made from polyethylene terephthalate, the polymer formed by the condensation reaction between ethylene glycol and terephthalic acid), Mycalex, or any other suitable insulation material to be coated, is positioned within the chamber 10. (Polished Mylar is preferred as a substrate for the deposition of the tin alloy, thin-film (.05 to .25 micron) superconductive computer elements to be discussed.) The lead end of the coatable substrate material 21 is threaded through the aperture 19 and is secured to a take-up reel 24 along a path which is aligned to be engaged by a cooling surface means 22 filled with a cooling medium such as liquid air 23 during the deposition process discussed below. Due to the problem of peeling or other damage of films to be vacuum deposited on the substrate material 21, it is preferred that the take-up reel 24 have a relatively large diameter whereby the coated substrate material is not subjected to appreciable flexure.

In order to further avoid the problem of peeling or other damage of vacuum deposited films due to flexure, another substrate handling arrangement may be used. In this alternate arrangement, shown in greater detail in FIG. 2, a rigid substrate **21*a*, such as glass or other relatively rigid plastic, is secured to the relatively flexible tape material 21. In the following discussion the term "substrate" will be used in connection with the substrate material 21**, and this term is intended to include arrangements of the type referred to in connection with FIG. 2 as well.

Figures 2, 3, 4, 5:
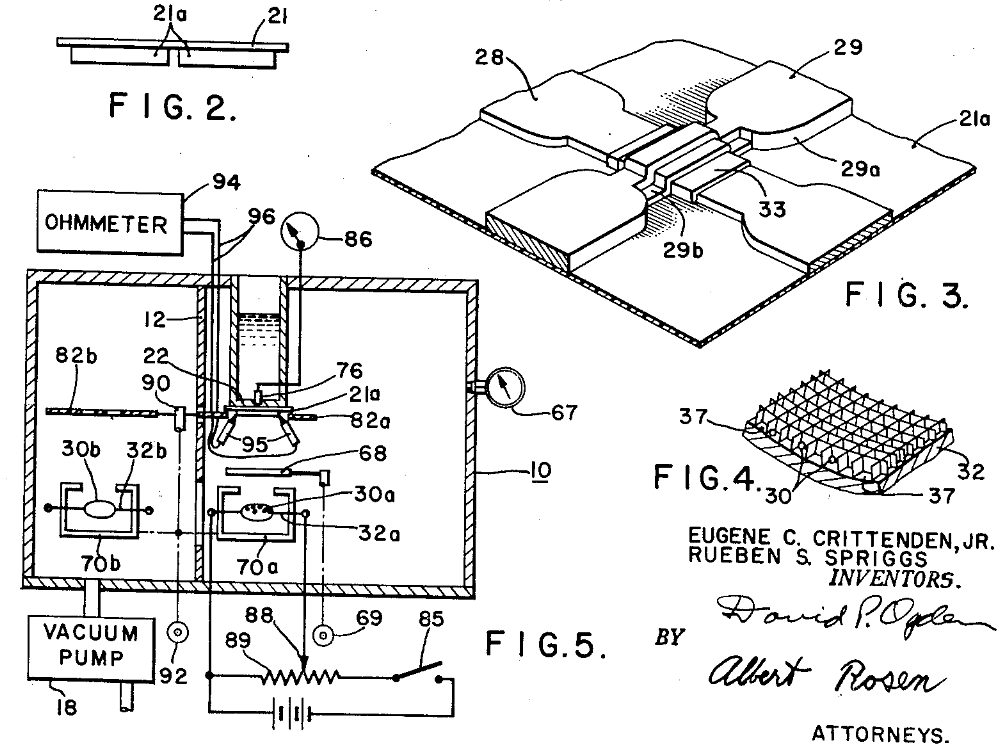
FIG. 2 is a detail view of a portion of a workpiece being processed in the apparatus of FIG. 1.
FIG. 3 is an enlarged fragmentary perspective view of a portion of the workpiece depicted in FIG. 2.
FIG. 4 is an enlarged detail perspective view of a portion of the vaporizing means depicted in FIG. 1.
FIG. 5 is a side elevation view of another embodiment of the present invention.

While the detail involved in the construction and operation of superconductive computer components will not be completely explained here, a fragmentary view of one such component is depicted in FIG. 3. As shown in FIG. 3, the substrate **21*a* may be used to support two tin alloy, thin-film superconductive elements 28 and 29. The elements 28 and 29 are insulated from each other by a thin insulating film 33. Furthermore, one of the elements, element 29, may have portions of different thicknesses in order to effect the desired switching functions. Thus, one portion 29*a* may be thicker than another portion 29*b***. A description of the construction and operation of such a superconductive switching arrangement may be referred to in the copending application of Schmidlin, Learn, and Spriggs entitled "Information Handling Arrangements,"

Serial No. 10,213, Series of 1960, and assigned to the same assignee as the present invention.

Referring again to FIG. 1, intermediate to the cooling surface means 22 and the take-up reel 24 is located another (or more) cooling surface means 25 filled with a cooling medium 26 such as boiling water. In the region of this second cooling surface means 25 is located another vaporization deposition apparatus 27, shown in block diagram only, which is in many respects similar to the one described in detail herein except that the apparatus 27 may contain completely different vapor deposition alloys or materials such as insulating materials, exemplified by silicon monoxide. This second deposition apparatus 27 may be used to fabricate the insulating film 33 referred to in connection with FIG. 3. The vapor shield 12 prevents intermingling of the two distinct vapors and the vapor shields 12*a* and 12*b* prevent undesired coating of the substrate 21.

It should be noted that the liquid air adjacent to the cooling surface means 22 will maintain the cooling surface means 22 in a temperature range of the order of −20° C. dependent upon the mass of hot alloy vapor applied thereto and the thermal conductivity of the surface means 22. On the other hand, the second cooling surface means 25 is maintained at a temperature of the order of 100° C. This difference in temperature is desirable because of certain problems relating to vapor deposition. Thus, for instance, metals such as tin alloys, when applied to a hot substrate, tend to migrate until a nodule or nucleation center is established. As a result, when attempts are made to vapor deposit such metals on a hot substrate the deposition layer will tend to be formed of a multiplicity of undesirable non-uniformities rather than a smooth surface. On the other hand, if the substrate is too cool and the particular material used has a very high vapor temperature, separation in the form of peeling tends to occur because of the temperature differential. With certain metals the formation of nucleation centers is a most severe problem and the substrate should be maintained close to a critical temperature (to be discussed), the particular temperature depending on the layer thickness.

On the other hand, certain other vapor deposition materials (including certain insulation materials) are far more likely to peel because of the relatively high deposition temperature compared to the substrate temperature. Therefore, when coating with such substances, the temperature of the exposed surface of the substrate 21 receptive of these materials should be maintained much higher. When vapor depositing silicon monoxide, an insulating material commonly used in certain superconductive arrangements, the substrate should be about 100° C. Similarly, when fabricating an insulating material such as a polymerized in situ organic silicone material such as polydimethylsiloxane (where the insulation film is formed by the electron bombardment of a substrate in the presence of a silicone oil vapor, the electron beam creating a solid polymer film on the substrate), the substrate preferably should be maintained at a temperature of at least around 25° C. in order that the molecules be readily cross-linked to form the solid polymer film. Also, other metals or materials require a hot substrate; for instance, a nickel metal deposition should be accomplished on a relatively warm substrate to reduce the likelihood of rupture.

For the tin alloys discussed, the optimum deposition temperature should be maintained at about zero degrees centigrade when the deposited layers are made having thicknesses of from .05 micron to .4 micron. For thicknesses below .05 micron, the temperature must be maintained below zero degrees centigrade in order to improve the surfaces' uniformity. The tensile forces do not reach the rupture point until a temperature of the order of below −100° C. is reached. For thicknesses above .4 micron, the temperature must be maintained at about −20° C. in order to overcome non-uniformity caused by unequal rates of crystal growth.

The reasons for the foregoing criticality are believed to be as follows. It has been determined that extremely uniform, thin metal superconductive films can be formed on a substrate by reducing the temperature of the substrate. One of the physical phenomena by which this occurs is believed to be associated with the reduced surface mobility of the metal atoms as they arrive on a low temperature substrate. It is believed that crystals of the metal first begin to grow from the initially deposited metal atoms which come to rest on the substrate, these atoms serving as the first seeds or crystal nuclei. As the crystals grow from these first seeds, later arriving atoms which have not yet come to rest will tend to adhere to these crystals rather than to the bare substrate. The crystals continue to grow until they touch each other and merge into a continuous film. It has been determined that the mobility of the arriving atoms is reduced by reducing the temperature of the substrate; a reduction in temperature causes a greater number of arriving atoms to come to rest separately and serve as crystal seeds before merging with already growing crystals. By starting with a greater number of crystal seeds, the film is more uniform.

Once the crystals have started growing, some crystal faces may have a tendency to grow faster than others by a phenomenon known as the Frank spiral crystal growth mechanism, discovered by Professor F. C. Frank at the University of Bristol, England. The crystal faces that grow more rapidly are those that have a spiral dislocation ending in them. The critical condition necessary for this type of crystal growth to occur is the ability of arriving atoms to accept or reject a site on a crystal face according to the stability of the atoms in this site. It has been determined that this freedom of the atom, or its mobility, can be reduced by reducing the temperature of the substrate, thereby preventing the uneven growth of crystals.

While the phenomena discussed above would appear to dictate that the temperature of the substrate should be maintained as low as possible, there is a different effect which works against reducing the substrate temperature; namely, that the tensile stress developed in a vacuum deposited metal film increases as the temperature of the substrate is reduced. The increased stress is believed to be associated with the reduced mobility, or freedom, of the atoms in permitting them to find their proper locations on the growing crystal lattice. As the atoms become buried in subsequent layers, they succumb to the increased forces tending to rearrange them. In the rearrangement to the proper crystal structure, the volume of the metal is reduced and tensile stress is thus developed in the deposited film. As the thickness of the film builds up, the tensile forces may increase to the point where they ultimately cause the film to rupture in spots, or even peel from the substrate.

In practicing the invention, the critical temperatures discussed are required for the optimum deposition of the thin alloy superconductive films. These critical temperatures assure that the deposited films will have the required high degree of uniformity in thickness and will also be free from temperature induced ruptures. The optimum temperature is found to be that temperature at which the maximum tolerable stress is developed in the film without giving rise to a tendency toward film rupture.

It is also recognized that even in a mechanized system producing only one alloy layer on a substrate it is often desirable to anneal the deposited material. When the deposited material is primarily elemental tin, the provision of the surface means 25 and maintaining of this surface at approximately 100° C. will heat the substrate and the alloy deposited thereon sufficiently to provide desired annealing. Obviously, other temperatures than 100° C. may be used for annealing alloys of substantially different metals.

The effectiveness of the temperature controlling cooling surface means 25 and 22 is augmented by the provision of additional cooling surfaces illustrated in FIG. 1 as the lead-in toe portions 35 and 35a respectively.

It should also be noted that although relatively few specific examples of materials for deposition are defined in detail below, it is recognized that the process and the apparatus of the present invention are usable to obtain vapor depositions of various types. For instance, the deposition of an alloy 96% tin and 4% lead will result in the formation of a crystal lattice resulting in imperfection scattering of the conductive materials whereby the resistive component of the superconductive element may be selectively increased compared to pure tin. As a further example, it is known that certain mercury alloys exhibit desirable superconductive-resistive switching characteristics. The vacuum alloy deposition arrangement discussed herein can also be used for the fabrication of superconductive devices using such alloys because this arrangement facilitates vaporization of alloyable metals having substantially different vaporization temperatures. Thus, a mercury-indium alloy comprising from 1½ atomic percent to 2 atomic percent mercury, and the balance indium, is advantageous in producing thin film devices having high switching speeds. The simultaneous evaporation of mercury and indium is made possible because the arrangement of the invention contributes to the uniformity, and thus to the resultant high switching speed of such alloy devices.

Referring again to FIG. 1, and prior to the sealing of the chamber 10, an alloy material is prepared for vapor deposition of the substrate 21. This alloy material is selected to provide desired properties in the coating. For instance, when it is desired to vapor deposit thin film superconductive switching elements having the electrical properties of tin, yet being free of "tin disease," the alloy material prepared is between about 98 and 99 percent tin and about 1 to 2 percent bismuth. The amount of bismuth necessary to prevent tin disease is at least about one-half percent and the maximum amount of bismuth producing acceptable characteristics of the tin as a superconductive electrical component prevents the addition of more than about 2½ percent bismuth. Within such an alloy range the only appreciable electrical difference in the alloy characteristic from pure tin is that, in its resistive state, the alloy exhibits a slightly higher resistance. The counterpart, of course, does not exhibit any resistance in the superconductive state. However, the superconductive properties of a superconductive switching element remain substantially the same as that of pure tin only as long as the proportion of bismuth remains below of the order of 2½ percent. Greater amounts of the impurity bismuth will prevent superconductivity. An example of a similar superconductive alloy is 96 to 98 percent tin and 4 to 2 percent antimony, respectively.

In order to provide a uniform alloy solution deposit, it is necessary to provide a homogeneous mixture of the metal powders (30). In accordance with one embodiment of the present invention, an alloy such as tin bismuth has been prepared as a homogeneous solid stock and is then ground into a fine homogeneous powder 30 by one of the known comminution techniques. With most alloy materials contemplated, this powder should be of a particle size on the order of 50 to 500 microns in diameter. With such a size particle it is expected that 10 to 1000 particles will be vaporized to accomplish each subcircuit deposition of superconductive elements. Once the alloy to be vapor deposited is prepared in this manner, a supply of the fine homogeneous powder 30 is placed in a supply reservoir 31 at a point effectively remote from a heating receptacle 32. Thus the fine powder 30 will flow freely from the reservoir 31 to a vibratory trough 34 and will flow along the trough to the heating receptacle 32 in accordance with the vibration imparted to the trough 34. The rate at which the homogeneous powder is supplied to the heating receptacle 32 is selected so that the powder 30 does not collect thereon as a large mass. In this way each powder particle is heated separately.

Referring now to FIG. 4 there is shown an enlarged detail view of the heating receptacle 32 which is arranged to provide several separate recesses 37, each suitable for maintaining a very small mass of the alloy being vaporized. In actual operation of the system it is preferred that the heating rate of the heating receptacle 32 and the flow rate of the powder be such that no more than one or two individual particles of metal collect in any one of the recesses 37. With the finely ground powder 30, the recesses 37 may have a maximum lateral dimension on the order of one millimeter whereby many particles may be scattered over the surface of the heating receptacle 32 without appreciable likelihood that more than one will come to rest in a single recess 37.

Referring again to FIG. 1, the trough 34 may be vibrated in any conventional manner with the frequency and/or magnitude of the vibration being regulated to enhance a desired flow rate despite any effective viscosity and/or the adhesion to the trough 34 of the fine powder 30 being used. The particular apparatus illustrated in FIG. 1 for vibrating the trough 34 includes major components of a sonic speaker system wherein an Alnico magnet 36 creates a constant magnetic field in the region of a coil 38, providing a varying magnetic field. The coil 38 is energized in accordance with an energizing frequency provided by a relatively low frequency alternating current power supply 40. In certain applications it is preferred to use a sawtooth wave generating power supply 40 and thus eliminate any need for sloping the trough 34. The coil 38 is supported within the magnetic field by a flexible diaphragm or web 42 and is secured to the trough 34 in a driving relationship.

In accordance with the particular powder feeding system illustrated, usually the upper surface of the trough 34 must be highly polished and will be inclined a predetermined amount in the region of the reservoir 31 so that, dependent upon the frequency and magnitude of the vibrations created by the power supply 40, the fine homogeneous powder 30 will traverse the trough 34 at a predetermined rate. However, in the region of the heating receptacle 32 it is usually desirable to have a greater inclination of the trough 34 so that any heat radiating from the receptacle 32, which will tend to heat the end of the trough adjacent thereto, will not cause the powder 30 to adhere to the trough 34. In order to reduce further the likelihood of heating of the trough 34 there is secured thereto a heat shield material 44 in the region of the heating receptacle 32. The trough 34 itself will usually be made of a metallic material such as tantalum which is highly polished. Similarly, the heating receptacle 32 may be made of tantalum.

Additional support for the trough 34 is provided by a sliding surface or roller means 50, and additional thermal protection is provided the magnet 36 and the powder reservoir 31 by a heat barrier insulation means 52 and a cooling system including cooling coils 54 and a coolant pump means 56. When using certain alloys which do not readily adhere to the surface of the trough 34, the additional cooling provisions are unnecessary if the spacing of the various portions of apparatus within the chamber 10 is properly arranged and shielded.

On the other hand, the problem of tackiness or other flow stoppage phenomena is overcome by the provision of a wiper 57 which both engages the end portion of the trough 34 and shields, at least partially, the trough 34 from radiant heat developed by the heating receptacle 32. Usually, because of the temperatures encountered in this region of the apparatus, it will be most desirable to use a counterbalancing weight 58 positioned relative to a pivot support 59 to maintain desired engagement between the wiper 57 and the trough 34. The use of a tempered spring in this heated environment is likely to result in erratic operation. Because of the continuous radiant heat it is preferred that the wiper 57 have a surface of polished, heat reflective aluminum disposed toward the heating receptacle 32 and a surface remote therefrom which is radiative of heat energy.

It is preferred that the heating receptacle 32 be inductively heated as by a high frequency coil 60 and a power supply 62. Obviously, many other heating means may be used without departing from the spirit of the present invention. Usually, however, it is preferable to heat by electrical means such as induction heating or electron bombardment. Although it is recognized that a flame heater may be used when the lower portion of the chamber 10 is arranged to expose to the outside of the chamber 10 the lower surface of the heating receptacle 32, such a construction causes vacuum sealing problems which are avoided by the electrically heatable construction illustrated.

In a preferred form of the invention the temperature of the heating receptacle 32 is regulated as by a thermocouple 64. With the inductive heating illustrated, the thermocouple 64 will sense primarily the temperature of the heating receptacle 32 and is connected to regulate the power supply 62 to control the temperature within a range which maintains the desired evaporation rate of each of the constituents of the homogeneous powder 30 but which is substantially below a temperature which will tend to change the flow characteristics of the powder 30 from the reservoir 31 along the trough 34 and past the wiper 57. Usually the upper limits of the temperature of the heating receptacle 32 are determined by the tendency of the powder to be violently agitated to cause splattering during vaporization. When using an alloy consisting primarily of tin, the temperature is maintained between 1000° C. and 1100° C. Such a temperature will not inhibit the desired flow of the powder 30. Usually the temperature will be regulated so that each particle of powder 30 will be completely evaporated within a specific period of time such as a few seconds.

It has been found that electrostatic charges sometimes exist in connection with the movement of finely powdered materials, particularly insulation materials. Any electrostatic charge may be dispersed or be made ineffective by providing static grounding line connectors 66 such as braided cables attached between the trough 34 and the reservoir 31 at one end thereof and the heating receptacle 32 and the trough 34 at the other end thereof.

Once the system is in operation and evacuated by the vacuum pump 18, the provision of vibratory power to the trough 34 causes the powder 30 to traverse the trough 34 and flow at a uniform rate to the heating receptacle 32. After evacuation and during heating of the heating receptacle 32 it usually occurs that certain gases or other materials are driven into the space within the chamber 10. If deposition were attempted at this time, the resulting film would be contaminated. To prevent such contamination, a shield 68 is placed between the heating receptacle 32 and the substrate 21 in the region of the cooling means 22. With the chamber 10 evacuated and the heating receptacle 32 heated, when the proper degree of vacuum has again been reached and is maintainable as indicated by a vacuum meter 67, the vapor shield 68 is removed by operation of a control lever such as a handle 69 to allow coating of the substrate 21 with an alloy vapor which is not contaminated.

During this "warm up" time when the contaminants are being removed, some of the particles of the powder 30 tend to become partially vaporized so that the alloy vapor reaches the desired rate whereby each of the metal constituents is being evaporated to provide the proper ratio. As a result, during normal start up procedures the probability of undesired alloy vapor ratios is substantially eliminated. After a period of a few seconds or minutes a coating film is formed on the substrate and the substrate may be moved to another location to receive another type of coating over at least selected portions thereof.

In order to obtain a desired alloy vapor the temperature of the heating receptacle 32 is maintained above the vaporization temperature of each of the metals or other constituents of the alloys within the powder 30. Thus, during a continuous operation of the apparatus of FIG. 1 when a particular powder particle first impinges upon the heating receptacle 32, the lowest temperature metal of the alloy will vaporize first, with other metal portions thereof vaporizing consecutively in accordance with their respective vaporization temperatures. However, once a few of the particles have impinged upon the heating receptacle 32, some of the particles are supplying a metal vapor of highest vaporization temperature while some of the more recently impinging particles thereon are being vaporized of the metal having the lowest vaporization temperature. In this way an alloy vapor is provided. On the other hand, when the alloy percentages are not as critical as in the case of a tin superconductive component, it is feasible to use a homogeneous mixture of different alloyable metal powders to provide the desired alloy vapor. The alloy vapor is directed toward the substrate 21 by a shield 70.

Also, certain of the vapor materials may be electrostatically chargeable in which case an accelerating electrode such as an annular ring electrode 72 may be used to supplement vapor directing by the shield 70. If it is desired to use the electrode 72, it is powered by a unidirectional power supply 74. Usually the shield 70 effectively blocks undesired scattering of the vapor whereby a major portion of the vapor which traverses the shield 70 impinges against the surface of the substrate 21 to obtain a desired alloy vapor deposition. The nozzle and heating receptacle arrangement is selected and operated to provide a vapor velocity which will not increase the problem of creating nucleation centers but which will reduce to a major extent vapor deposition on other portions of the apparatus such as the trough 34 or the wiper 57.

In connection with maintaining desired temperatures and deposition thicknesses, it is contemplated that the flow rates from the various power supplies of the present invention should be synchronized. For instance, if the cooling surface means 22 should become too cold to obtain a desired substrate surface temperature, a signal obtainable from a thermocouple 76 is applied to the power supply 40 to increase the rate of said powder supply and thus the rate of vaporization so that the heat dissipated on the cooling surface means 22 is increased. Thus the substrate temperature is raised in accordance with known thermal conductive phenomena.

However, since the rate of deposition has been increased, it is also necessary to increase the speed of the take-up reel 24 to obtain a uniform desired thickness alloy layer. This may be accomplished by synchronizing a reel driving power supply 80 to the power supply 62 controlling the vaporization rate of the powder 30. Similar synchronizing signals should be applied to the apparatus 27 for regulating its vapor deposition rate to obtain a desired and uniform insulation coating thickness over the conductive alloy materials being printed by vapor deposition discussed above.

In a mechanized system defined above it is preferred that the coating thickness be determined as a function of time. However, other film thickness sensing techniques are adopted to initiate removal of the vapor coated substrate 21 from a position receptive of alloy vapors. For instance, after terminals have been placed on a substrate, some or all of them may be engaged by various ohmmeter probes to monitor the impedance of the particular film being applied. As the film reaches the desired maximum thickness (minimum resistance), the take-up reel 24 is activated. This monitoring is usually necessary on a few components, as during start up of the mechanized process.

Moreover, it is recognized that the above described apparatus and process may be utilized to form predesigned subcircuit arrangements of the type illustrated in FIG. 3 by placing various masking devices as illustrated by a sacrifice masking tape 82 over the substrate 21 with the tape 82 having various resistive, capacitive or inductive design apertures therein which allow passage of the desired vapor to the substrate 21 but prevent undesired coating portions. When used in this manner the sacrifice tape is separated from the substrate and wound on a separate take-up reel 84 only after the substrate 21 is within a region protected by a vapor shield such as the shield **12*b*. Consideration of masking techniques leads to the conclusion that several different masks may be used. For instance, several very thin masking tapes may be used, with the first to be removed defining the most restricted circuit elements or sub-elements, the next defining the insulation of these elements, etc. In this way many thousands of complete elements and/or sub-circuit assemblies may be printed on the substrate 21** during a single operational phase of the above described process.

Similarly, it is recognized that the process described need not be automated as illustrated in FIG. 1. As shown in FIG. 5, a single element or subcircuit component may be created by the utilization of a single rigid surface of a substrate **21*a*, cooled as by the cooling surface means 22, and a few particles of alloy powder 30*a* being selectively secured to a tantalum heating wire 32*a*. In such a simplified process, a relatively simple vapor shield 70*a* allows the escape of a portion of the alloy vapor only toward the surface of the substrate 21*a*. In operation, the arrangement of FIG. 5 will result in a desired vapor deposition when the operator closes a switch 85 as a thermometer 86 connected to the thermocouple 76 indicates that the substrate 21*a* is approaching the desired vapor deposition temperature. When the vacuum, as indicated on the meter 67, indicates the removal of any contaminating gases which are often released during heating of the wire 32*a*, the vapor shield 68 is removed by rotation of its control handle 69. Also, it is feasible to regulate the rate of vaporization to control the temperature of the substrate 21*a* by varying the setting of a voltage tap 88 of a voltage divider 89 and thus control the heat of condensation occurring at the surface of the substrate 21*a*. It is also recognized that variable deposition is obtainable by selected orientation of the surface of the substrate 21*a* relative to the center of mass of the powder 30*a***.

Moreover, it is usually desirable to place a mask **82*a* over portions of the surface of the substrate 21*a* to obtain selected configurations of the vapor deposition during each stage of deposition. Usually the mask will be modified several times between deposition operations to obtain a device of the type illustrated in FIG. 3. One simple arrangement for accomplishing this modification is illustrated in FIG. 5 wherein a second heating wire 32*b*, a second vapor shield 70*b*, and a second mask 82*b* are mounted on a rotatable support 90 under the control of a handle 92. The second source of vapor is maintained in storage behind the vapor shield 12**. Obviously, several additional vapor sources may be stored adjacent to the one illustrated.

With the apparatus of FIG. 5 it will often be desirable to detect impedance characteristics of deposition layers by means of a balanced bridge type or self balancing potentiometer type ohmmeter 94 connectable by means of probes 95 and a plurality of wire connectors 96 to electrodes on the substrate. In FIG. 5 the substrate remains stationary while the heating receptacles, wires, and shields are rotatable. It is preferred to position probes 95 on the substrate after electrodes have been placed thereon as by vapor deposition. However, since the thickness of the electrodes is usually not considered to be critical, the electrodes may be placed on the substrates **21*a* prior to their being placed within the particular vacuum chamber 10** shown in FIG. 5.

In operation, the various heating wires with alloy metals and other materials thereon are placed on the rotatable mount 90, the substrate (or series of substrates) is positioned so that it may be secured adjacent to the cooling means 22, and the masks, heating wires and shields are sequentially positioned between each deposition operation. During a first deposition, a lead alloy, may be deposited between two of several of the electrodes on the substrate **21*a***. During a second deposition a thin layer of insulation may be applied. During a third deposition, a layer of tin alloy may be connected between two of the electrodes, one or both of which may be connected to the previously deposited lead film. A next layer may be insulation and a following layer of tin alloy or some other material (such as indium) is then applied, depending on the specific characteristics desired from the particular computer component being prepared. Since many computer component circuits differ slightly from each of the other components in the computer, the utilization of the apparatus of FIG. 5 may be most desirable for the fabrication of a single superconductive computer. However, if many similar superconductive computers or component sub-circuits are to be manufactured, the apparatus described in connection with FIG. 1 will provide substantial economic advantages.

While we have shown and described particular embodiments of this invention, further modifications and improvements will occur to those skilled in the art. For instance, the coating thickness may be regulated by selectively changing the frequency or magnitude of the vibrations of the trough 34 or by selectively regulating the speed at which the take-up reel 24 is driven. Moreover, although only a few alloys have been discussed in detail, it is recognized that more complex alloys may be vapor deposited by the method taught above. We desire it to be understood, therefore, that this invention is not limited to the particular forms shown, and we intend by the appended claims to cover all such modifications which do not depart from the true spirit and scope of this invention.

What we claim as new and desire to secure by Letters Patent of the United States is:

1. A superconductive switching device comprising: a substrate; a first superconductive film member secured to the substrate; an insulating film covering at least a portion of said first superconductive member; and a second superconductive member mounted on at least portions of said insulating film, at least one of said superconductive members consisting of a deposited in situ alloy consisting of at least about 96% elemental tin and in solution therein at least about one percent (1%) of an element selected of the class consisting of bismuth and antimony, and wherein said element is dissolved throughout said tin such that said at least one member exhibits a superconductive-resistive change-in-state characteristic that is substantially the same as the superconductive-resistive characteristic associated with a superconductive member consisting of only elemental tin, and wherein said at least one member contains at least an amount of said element sufficient to preserve said member from white to gray tin change-in-state susceptibility, and said insulating film consisting of a fabricated in situ polymerized material.

2. A superconductive switching component, comprising: a substrate, and a thin film bonded to said substrate, said film consisting of an alloy layer of about .03 to .25 micron thickness and being substantially of at least about 96 percent in elemental tin and in solution therein at least about 1 percent of an element selected from the class consisting of bismuth and antimony and wherein said element is dissolved throughout said tin such that said film exhibits a superconductive-resistive change-in-state characteristic that is substantially the same as the superconductive-resistive characteristic associated with a superconductive member consisting of only elemental tin, and wherein said film contains at least an amount of said element sufficient to preserve said film from white to gray tin change-in-state susceptibility.

3. A superconductive switching component, comprising: a substrate, and a thin film bonded to said substrate, said film consisting essentially of a solution in elemental tin of an element selected from the class consisting of bismuth and antimony, and wherein the amount of said element is such that said member exhibits, at temperatures below about 3.7 degrees Kelvin, a superconductive-resistive change-in-state characteristic that is substantially the same as the superconductive-resistive change-in-state characteristic associated with a superconductive member consisting of elemental tin, and wherein said film contains at least an amount of said element sufficient to preserve said film from white to gray tin change-in-state susceptibility within a temperature range of between about 3.7 degrees Kelvin and about 255 degrees Kelvin.

4. A superconductive switching device comprising: a substrate, and a thin film on said substrate, said film consisting essentially of tin in an amount of from the order of 97½ percent to 99½ percent, with the other constituent being bismuth in an alloy solution, said film having a thickness on the order of .1 micron.

5. A superconductive switching device comprising: a substrate, and a thin film on said substrate, said film consisting essentially of tin in an amount of from of the order of 96 percent to 98 percent, with the other constituent being antimony in alloy solution.

6. A superconductive switching component, comprising: a substrate, and a thin film on said substrate, said film consisting essentially of at least 96 percent elemental tin and in solution therewith at least about 1 percent of an element selected from the class consisting of bismuth and antimony and wherein said element is dissolved throughout said tin such that said film exhibits a superconductive-resistive change-in-state characteristic that is substantially the same as the superconductive-resistive characteristic associated with a superconductive member consisting of only elemental tin, and wherein said film contains at least an amount of said element sufficient to preserve said film from white to gray tin change-in-state susceptibility.

References Cited in the file of this patent

UNITED STATES PATENTS

| | | |
|---|---|---|
| 1,784,611 | Polanyi et al. | Dec. 9, 1930 |
| 2,936,435 | Buck | May 10, 1960 |

FOREIGN PATENTS

| | | |
|---|---|---|
| 770,077 | Great Britain | Mar. 13, 1957 |

OTHER REFERENCES

Harris et al.: "Journal of Applied Physics," vol. 19, August 1948, pp. 739–741.

Holland: "Vacuum Deposition of Thin Films" (1956), John Wiley and Sons, Inc., N.Y., pp. 189–196, pp. 195 and 196 relied on.